(12) United States Patent
Zheng et al.

(10) Patent No.: US 8,192,643 B2
(45) Date of Patent: Jun. 5, 2012

(54) GRAPHITE MICROFLUIDS

(75) Inventors: Ruiting Zheng, Beijing (CN); Jinwei Gao, Zhangjiajie (CN); Gang Chen, Carlisle, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/638,135

(22) Filed: Dec. 15, 2009

(65) Prior Publication Data

US 2011/0140033 A1    Jun. 16, 2011

(51) Int. Cl.
   *C09K 5/00*       (2006.01)
   *C10M 169/04*     (2006.01)
   *C01B 31/04*      (2006.01)

(52) U.S. Cl. ............ 252/73; 252/71; 508/113; 977/778; 977/779; 977/783; 977/784; 977/786; 977/788; 423/448

(58) Field of Classification Search .......... 252/71, 252/73; 508/113; 977/778, 779, 783, 784, 977/786, 788; 423/448
   See application file for complete search history.

(56) References Cited

U.S. PATENT DOCUMENTS

| | | | | |
|---|---|---|---|---|
| 4,442,019 A * | 4/1984 | Marks | | 252/583 |
| 5,073,278 A * | 12/1991 | Schumacher et al. | | 508/262 |
| 5,127,949 A * | 7/1992 | Nakazawa et al. | | 106/36 |
| 6,695,974 B2 | 2/2004 | Withers et al. | | |
| 6,783,746 B1 * | 8/2004 | Zhang et al. | | 423/447.1 |
| 7,329,559 B2 * | 2/2008 | Bernds et al. | | 438/99 |
| 7,348,298 B2 * | 3/2008 | Zhang et al. | | 508/113 |
| 7,727,414 B2 * | 6/2010 | Hwang | | 252/71 |
| 7,871,533 B1 * | 1/2011 | Haiping et al. | | 252/70 |
| 7,914,844 B2 * | 3/2011 | Stankovich et al. | | 427/58 |
| 2004/0069454 A1 * | 4/2004 | Bonsignore et al. | | 165/104.15 |
| 2004/0206941 A1 * | 10/2004 | Gurin | | 252/500 |
| 2004/0224852 A1 * | 11/2004 | Halliday et al. | | 507/140 |
| 2004/0262584 A1 * | 12/2004 | Bonnet et al. | | 252/511 |
| 2005/0124504 A1 * | 6/2005 | Zhang et al. | | 508/128 |
| 2006/0147632 A1 * | 7/2006 | Zhang et al. | | 427/297 |
| 2007/0131915 A1 * | 6/2007 | Stankovich et al. | | 252/511 |
| 2007/0293405 A1 * | 12/2007 | Zhang et al. | | 508/113 |
| 2008/0090951 A1 | 4/2008 | Mao et al. | | |
| 2008/0242566 A1 * | 10/2008 | Lockwood et al. | | 508/113 |
| 2008/0287326 A1 * | 11/2008 | Zhang et al. | | 508/113 |
| 2009/0036605 A1 * | 2/2009 | Ver Meer | | 525/55 |
| 2009/0123752 A1 | 5/2009 | Prud'homme et al. | | |
| 2009/0143250 A1 | 6/2009 | Lee et al. | | |
| 2009/0298725 A1 | 12/2009 | Zhang et al. | | |
| 2010/0028671 A1 * | 2/2010 | Mitsui et al. | | 428/354 |
| 2010/0108937 A1 * | 5/2010 | Hwang | | 252/73 |
| 2010/0147188 A1 * | 6/2010 | Mamak et al. | | 106/31.13 |
| 2011/0003721 A1 * | 1/2011 | Hong et al. | | 508/113 |
| 2011/0052813 A1 * | 3/2011 | Ho et al. | | 427/256 |

OTHER PUBLICATIONS

International Search Report and Written Opinion mailed May 26, 2011 for Related International Application No. PCT/US2010/060507.

"International Nanofluid Property Benchmark Exercise," International Nanofluid Property Benchmark Exercise (INPBE) Workshop, Beverly Hills, California, Jan. 29-30, 2009.

Balandin et al., "Superior Thermal Conductivity of Single-Layer Graphene," *Nano Letters*, vol. 8 (2008) pp. 902-907.

(Continued)

*Primary Examiner* — Mark Eashoo
*Assistant Examiner* — Jane L Stanley
(74) *Attorney, Agent, or Firm* — Wolf, Greenfield & Sacks, P.C.

(57) ABSTRACT

Fluids comprising graphite particles and related methods are generally described. In some embodiments, "microfluids" are described. Generally, the microfluids can comprise a fluid and a plurality of graphite particles with microscale dimensions.

20 Claims, 7 Drawing Sheets

OTHER PUBLICATIONS

Barrau, et al., "DC and AC Conductivity of Carbon Nanotubes-Polyepoxy Composites," *Macromolecules*, vol. 36 (2003) pp. 5187-5194.

Buongiorno, et al., "A benchmark study on the thermal conductivity of nanofluids," *Journal of Applied Physics*, vol. 106 (2009) pp. 094312-1-094312-14.

Bursill, et al., "Microdomains observed at the ferroelectric/paraelectric phase transition of barium titanate," *Nature*, vol. 311 (1984) pp. 550-552.

Campbell, et al., "Dynamical Arrest in Attractive Colloids: The Effect of Long-Range Repulsion," *Physical Review Letters* 94 (2005) p. 208301.

Carlson, et al., "Commercial Magneto-Rheological Fluid Devices," *5th Int. Conf on Electro-Rheological, Magneto-Rheological Suspensions and Associated Technology* Sheffield, Jul. 10-14, 1995.

Carlson, et al., "Commercial magnetorheological fluid devices" *Int. J. Mod. Phys. B* 10, 2857-2866 (1996).

Choi, et al., "Anomalous thermal conductivity enhancement in nanotube suspensions," Applied Physics Letters, vol. 79 (2001) pp. 2252-2254.

Chun, et al., "Highly conductive, printable and stretchable composite films of carbon nanotubes and silver," Nature Nanotechnology 5 (2010) pp. 853-857.

Deville, et al., "Freezing as a Path to Build Complex Composites," *Science* 311 (2006) pp. 515-518.

Eastman et al., "Anomalously increased effective thermal conductivities of ethylene glycol-based nanofluids containing copper nanoparticles" *Applied Physics Letters* (2001) 78:718-720.

Gao et al., "Experimental Investigation of Heat Conduction Mechanisms in Nanofluids, Clue on Clustering," *Nano Letters* 9 (2008), pp. 4128-4132.

Gharagozloo et al., "Aggregate fractal dimensions and thermal conduction in nanofluids," *Journal of Applied Physics* 108 (2010), p. 074309.

Golden et al., "The percolation Phase Transition in Sea Ice," *Science* 282 (1998), pp. 2238-2241.

He et al, "A new structural model for graphite oxide," *Chem. Phys. Lett.* 287, 53 (1998).

Huxtable et al., "Interfacial heat flow in carbon nanotube suspensions," *Nature Materials* 2 (2003), pp. 731-734.

Imada et al., "Metal-insulator transitions," *Reviews of Modern Physics* 70 (1998), pp. 1039-1263.

Israelachvili, et al., "Role of hydration and water structure in biological and colloidal interactions," *Nature* 379, 219(1996).

Jeong et al., "Thermal stability of graphite oxide" *Chemical Physical Letters* (2009) 470:255-258.

Keblinski et al., "Mechanisms of heat flow in suspensions of nano-sized particles (nanofluids)" *International Journal of Heat and Mass Transfer* (2002) 45:855-863.

Keblinski et al., "Thermal conductance of nanofluids: is the controversy over?" *J Nanopart Res* (2008) 10:1089-1097.

Konatham et al., "Thermal boundary resistance at the graphene-oil interface," *Appl. Phys. Lett.* 95, 163105 (2009).

Kwon et al., "The Preparation of Exfoliated Graphite by Using Microwave" *J Ind. Eng. Chem* (2003) 9:743-747.

Lerf et al, "Structure of Graphite Oxide Revisited," *J. Phys. Chem. B* 102, 4477 (1998).

Li et al., "Processable aqueous dispersions of grapheme nanosheets" *Nature Nanotechnology* 3 (2008) pp. 101-105.

Liang et al., "Thermal conductivity of composites with nanoscale inclusions and size-dependent percolation" *J. Phys Condens. Matter* 20 (2008) p. 365201.

Lu et al., "Fluids of Clusters in Attractive Colloids" *Physical Review Letters* 96 (2006) p. 028306.

Lu et al., "Gelation of particles with short-range attraction" *Nature* 453 (2008) pp. 499-503.

Moore et al., "A Surface-Tailored, Purely Electronic, Mott Metal-to-Insulator Transition," *Science* 318 (2007) pp. 615-619.

Moulson, A.J. and Herber, J.M., *Electroceramics: materials, properties, applications*, 2nd edition, 2003, John Wiley & Sons Ltd., The Atrium Southern Gate, Chichester, West Sussex PO19 8SQ, England.

Nagasaka, Y. and Nagashima A., "Absolute measurement of the thermal conductivity of electrically conducting liquids by the transient hot-wire method," *J. Phys E: Sci. Instrum* 14(1981), pp. 1435-1440.

Niyogi et al., "Solution Properties of Graphite and Graphene," *J. Am. Chem. Soc.* 128, 7720 (2006).

Patel et. al. "Thermal conductivities of naked and monolayer protected metal nanoparticle based nanofluids: Manifestation of anomalous enhancement and chemical effects," Applied Physics Letters 83 (2003), pp. 2931-2933.

Peng et. al. "Sulfonated carbon nanotubes as a strong protonic acid catalyst," *Carbon* 43 (2005), pp. 2397-2429.

Prasher et al., "Effect of Aggregation Kinetics on the Thermal Conductivity of Nanoscale Colloidal Solutions (Nanofluid)," *Nano Letters* 6 (2006), pp. 1529-1534.

Prasher et al., "Thermal Conductivity of Nanoscale Colloidal Solutions (Nanofluids)," Phys. Rev. Lett. 94, 025901 (2005).

Putnam et al., "Thermal conductivity of nanoparticle suspensions," Journal of Applied Physics 99 (2006), pp. 084308-1-084308-6.

Qazilbash et al., "Mott Transition in VO2 Revealed by Infrared Spectroscopy and Nano-Imaging," *Science* 318 (2007) pp. 1750-1753.

Quivy et al., "Transport Phenomena in polymer-graphite composite materials," Phys Rev B 39, 1025 (1989).

Raj et al., "Commercial Applications of Ferrofluids," *Journal of Magnetism and Magnetic Materials* 85 (1990) pp. 233-245.

Sciortino et al., "Equilibrium Cluster Phases and Low-Density Arrested Disordered States: The Role of Short-Range Attraction and Long-Range Repulsion," *Physical Review Letters* 93 (2004) p. 055701.

Shaikh et al., "Thermal Conductivity Improvement in Carbon Nanoparticle Doped PAO Oil: An experimental study," *Journal of Applied Physics*, 101, 064302 (2007).

Shenogina et al., "On the lack of thermal percolation in carbon nanotube composites," *Applied Physics Letters*, 87, 133106 (2005).

Stankovich et al., "Graphene-based composite materials," *Nature* 442 (2006) pp. 282-286.

Stradner et al., "Equilibrium cluster formation in concentrated protein solutions and colloids," *Nature* 432, 492-495 (2004).

Strumpler, R., et al, "Fast current limitation by conducting polymer composites," *J Appl. Phys* 81 (1997) 6786.

Strumpler, R., et al, "Smart Polymer Composite Thermistor," *Mat. Res. Soc. Symp. Proc.* vol. 600 (2000) pp. 293-298.

Tian et al., "Effect of interface scattering on phonon thermal conductivity percolation in random nanowire composites," *Applied Physics Letters* 90 (2007) pp. 263105-1-263105-3.

Tryba et al., "Preparation of exfoliated graphite by microwave irradiation," *Carbon* 43 (2005) pp. 2417-2419.

Tryba et al., "Influence of chemically prepared $H_2SO_4$ -graphite intercalation compound (GIC) precursor on parameters of exfoliated graphite (EG) for oil sorption from water," *Carbon* 41 (2002) pp. 2013-2016.

Vigolo et al., "An Experimental Approach to the Percolation of Sticky Nanotubes," *Science*, 309 (2005), 920-923.

Wei et al., "A rapid and efficient method to prepare exfoliated graphite by microwave irradiation," *Carbon*, 47 (2008), pp. 337-339.

Weng et al., "Transport properties of electrically conducting nylon 6/foliated graphite nanocomposites," *Polymer* 46, 6250 (2005).

Yang et al., "Chemical analysis of graphene oxide films after heat and chemical treatments by X-ray photoelectron and Micro-Raman spectroscopy" Carbon 47 (2009), pp. 145-152.

Yang et al. "Thermal and rheological properties of carbon nanotube-in-oil dispersions," *J. Appl. Phys.* 99, 114307 (2006).

Yasmin et al., "Processing of expanded graphite reinforced polymer nanocomposites," Composites Science and Technology, 66 (2006), pp. 1182-1189.

Yu et al., "Review and Comparison of Nanofluid Thermal Conductivity and Heat Transfer Enhancements," *Heat transfer Eng.* 29, 432(2008).

Zhang et al., "Experimental Study on the Effective Thermal Conductivity and Thermal Diffusivity of Nanofluids," International Journal of Thermophysics, 27 (2006), pp. 569-580.

Zheng et al., "Reversible temperature regulation of electrical and thermal conductivity using liquid-solid phase transitions," Nature Communications 2:289 (2011).

\* cited by examiner

GRAPHITE MICROFLUIDS

GOVERNMENT SPONSORSHIP

This invention was sponsored by NSF Grant No. CBET-0506830. The government has certain rights in the invention.

FIELD OF INVENTION

The present invention relates generally to fluids comprising graphite particles and related methods.

BACKGROUND

Many industrial and commercial systems such as, for example, power plants, automobile engines, and microelectronics systems require efficient heat transfer to achieve optimal operation. Conventional methods for enhancing heat transfer include incorporating extended surfaces (e.g., fins) into the heat exchanger system and increasing the flow rate of the heat transfer fluid. However, the use of these traditional methods is insufficient to achieve adequate heat transfer in many instances. Recent research has been done on high thermal conductivity fluids. Such fluids can be made, for example, by suspending materials with relatively high thermal conductivities in fluid with a lower thermal conductivity. In addition to providing adequate heat transfer in high-performance applications, the use of high thermal conductivity fluids can be used to reduce the size of heat exchanger units in applications with lower heat transfer demands.

The production of high thermal conductivity fluids can pose challenges. For example, in many instances, it is difficult to produce a stable suspension of high thermal conductivity material in a suitable heat exchange fluid. In addition, some materials, such as many nanoscale materials, do not produce sufficient increases in thermal conductivity when they are suspended in low thermal conductivity fluids. Finally, many materials used to produce high thermal conductivity fluids are prohibitively expensive for everyday use.

SUMMARY OF THE INVENTION

Fluids comprising graphite particles and related methods are generally provided.

In one set of embodiments, a microfluid is described. In some cases, the microfluid comprises a hydrophobic fluid and a plurality of graphite particles having an average maximum cross-sectional dimension of between about 500 nanometers and about 10 microns. In some instances, the graphite particles are capable of forming a stable suspension within the fluid in the absence of functional groups on the surfaces of the graphite particles.

In some embodiments, the microfluid comprises a fluid comprising at least one of water and an alcohol and a plurality of graphite particles having an average maximum cross-sectional dimension of between about 500 nanometers and about 10 microns suspended within the fluid, wherein the graphite particles can form a stable suspension within the fluid.

In some instances, the microfluid comprises a fluid, and a plurality of flakes, wherein each of the plurality of flakes has an aspect ratio of at least about 10:1, the plurality of flakes have an average maximum cross-sectional dimension of between about 500 nanometers and about 10 microns, and the plurality of flakes are capable of forming a stable suspension within the fluid in the absence of functional groups on the surface of the flakes.

In another set of embodiments, a method is described. In some cases, the method comprises adding a plurality of graphite particles to a fluid, wherein the plurality of graphite particles has an average maximum cross-sectional dimension of between about 500 nanometers and about 10 microns, the plurality of graphite particles are capable of forming a stable suspension within the fluid in the absence of a surfactant. The method can further comprise forming a stable suspension of graphite particles within the fluid.

Other advantages and novel features of the present invention will become apparent from the following detailed description of various non-limiting embodiments of the invention.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Fluids comprising graphite particles and related methods are generally described. In some embodiments, "microfluids" are described. Generally, the microfluids can comprise a fluid and a plurality of graphite particles with microscale dimensions. The graphite particles may be suspended in the fluid. The inventors have discovered that the use of microscale particles, rather than traditional nanoscale particles, can increase heat transfer rates and can improve suspension stability. In some embodiments (e.g., when the graphite particles are suspended in a hydrophobic fluid such as an oil), the graphite particles described herein may be capable of forming a stable suspension with a fluid in the absence of functional groups on the surfaces of the graphite particles (e.g., phenyl groups or carboxylic groups), in the absence of a surfactant, and/or or in the absence of any other stabilizing agent. In addition, the graphite particles may be capable of forming stable suspensions in hydrophilic fluids such as, for example, water and alcohols. The microfluids described here may be useful, for example, as a heat transfer medium in heat exchangers. The microfluids described herein may also be useful as an electrically conductive medium.

Figure 1:
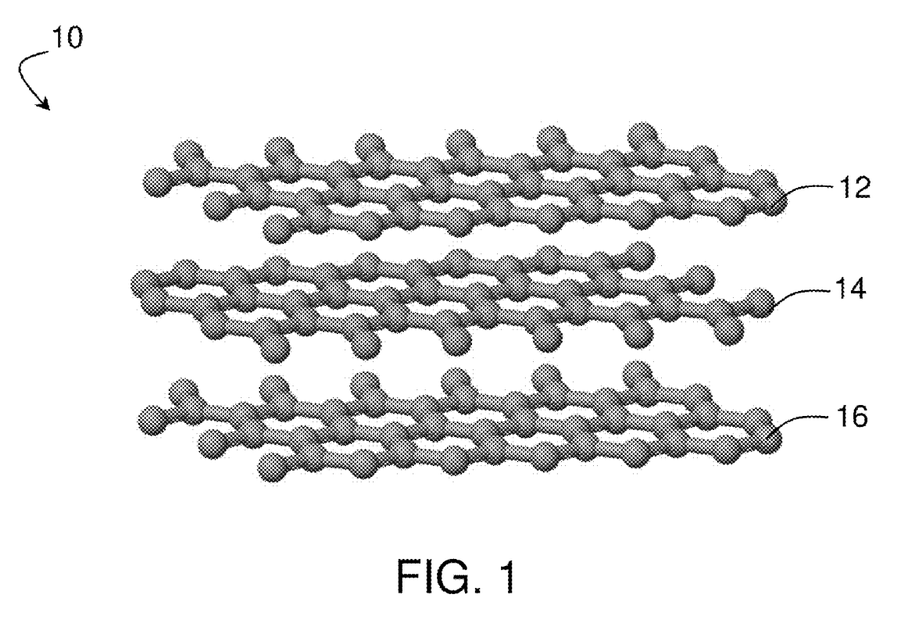
FIG. 1 includes an exemplary schematic illustration of the microstructure of a graphite particle.

FIG. 1 includes a schematic illustration of the microstructure of a graphite particle 10 that can be used in association with the embodiments described herein. Generally, the graphite particle structure comprises a plurality of layers (12, 14, and 16) of graphene. The layers of graphene comprise carbon atoms arranged in a hexagonal lattice. Adjacent graphene layers are typically attracted to each other via van der Waals forces, although covalent bonds may be present between one or more sheets in some cases. In some embodiments, a surface of a graphene layer can be oxidized, which can, in some cases, render at least a portion of the graphite particle hydrophilic. For example, in some cases, the graphite particle can be rendered substantially completely hydrophilic, or the graphite particle can be rendered amphiphilic.

Generally, graphite is capable of efficiently conducting heat and electricity. In some cases, the graphite particles described herein may be capable of conducting heat and/or electricity more efficiently in a first direction (and/or more directions, e.g., an in-plane direction) relative to a second direction (e.g., a second direction substantially perpendicular to the first direction). Such graphite particles are said to be anisotropic conductors. The first direction in which the heat and/or electricity is more efficiently conducted may be along the length of the particle (e.g., in a direction substantially parallel to the plane of a graphene sheet). The second direction in which the heat and/or electricity is less efficiently conducted may be along the thickness of the particle (e.g., in a direction that intersects multiple graphene sheets). In some embodiments, the particle dimension along the first direction is longer than the particle dimension along the second direction, and the particle is said to have high in-plane conductivity.

Graphite can also be a superlubricant. Superlubricity is a phenomenon known in the art, and generally refers to an effect wherein the friction between two surfaces approaches, but does not reach, zero. The use of superlubricants such as graphite can be useful in maintaining a relatively low amount of friction within the microfluids described herein. The use of low-friction fluids can allow for effective circulation using a relatively low amount of pumping power and can reduce the amount of surface damage to moving parts within a piece of equipment. In addition, low-friction, high-conductivity fluids may be useful in dual-purpose applications that require effective lubrication and high heat transfer. Not wishing to be bound by any theory, the superlubricity of graphite may arise from the relatively low attractive forces (e.g., van der Waals forces) between the layers of graphene within the graphite.

Figure 2:
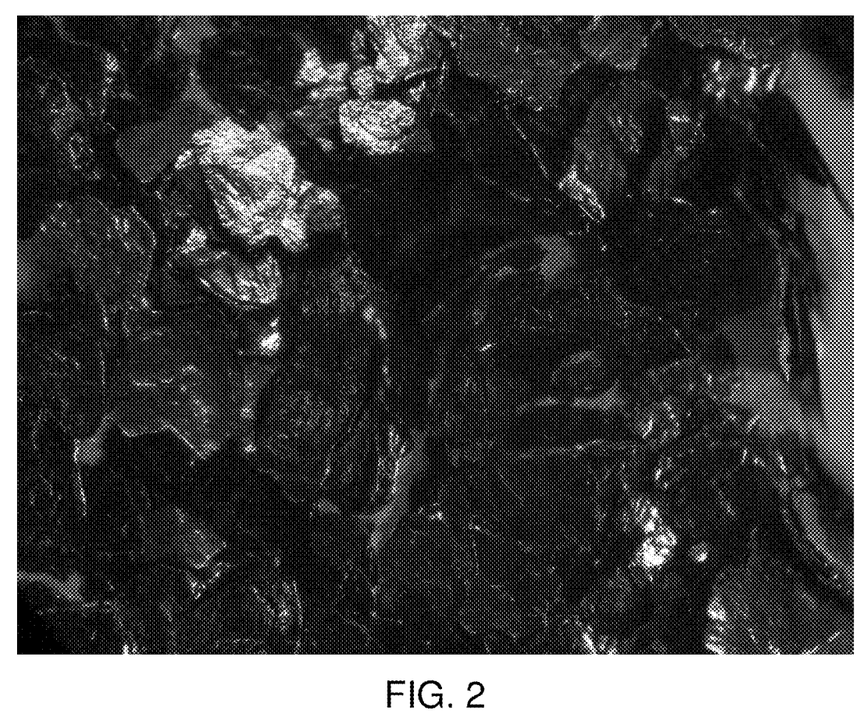
FIG. 2 includes an optical image at 30 times magnification of graphite particles before they are exfoliated, according to one set of embodiments.

Graphite particles can be formed of any suitable type of graphite. In some embodiments, the graphite particles can comprise or be made using natural graphite. FIG. 2 includes an optical image at 30 times magnification of exemplary graphite particles, according to one set of embodiments. Natural graphite can occur in a variety of forms. In some embodiments, the natural graphite can include crystalline flake graphite (commonly referred to as flake graphite). Generally, flake graphite occurs as isolated, flat, plate-like particles, with hexagonal edges if unbroken, and potentially irregular or angular edges when broken. In some cases, natural graphite can comprise amorphous graphite (also referred to as meta-anthracite) which is commonly used to refer to graphite that, despite its name includes graphite crystals occurring as fine particles resulting from, for example, the thermal metamorphism of coal. Very fine flake graphite is sometimes called amorphous by those skilled in the art. In addition, natural graphite can comprise lump graphite (also referred to as vein graphite) which can occur in fissure veins or fractures and appears as massive platy intergrowths of fibrous or acicular crystalline aggregates.

In some cases, the graphite particles can comprise or be made using synthetic graphite. Examples of synthetic graphite include, for example, Highly Ordered Pyrolytic Graphite (HOPG), electrographite, and the like. In some embodiments, the graphite particles can comprise or be formed from a combination of two or more types of graphite.

Figure 3:
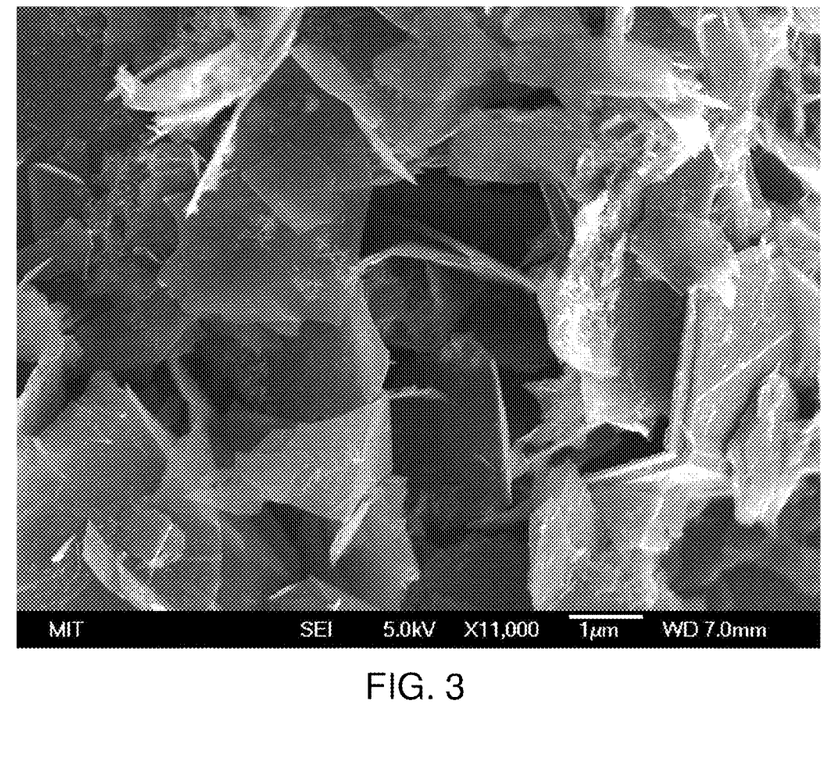
FIG. 3 includes an exemplary scanning electron microscope (SEM) micrograph of exfoliated graphite.

The graphite particles can comprise, in some embodiments, exfoliated graphite. FIG. 3 includes an exemplary scanning electron micrograph of exfoliated graphite, according to one set of embodiments. Methods for the production of exfoliated graphite are described below. In some embodiments, the exfoliated graphite may occupy a volume at least about 10 times, at least about 50 times, at least about 100 times, at least about 300 times, or at least about 500 times the volume of the graphite particles (e.g., graphite flakes) from which it is formed. Accordingly, the density of the exfoliated graphite particles may be at least about 10 times, at least about 50 times, at least about 100 times, at least about 300 times, or at least about 500 times less than the density of the graphite particles (e.g., graphite flakes) from which they are formed.

The graphite particles described herein can include a relatively high amount of carbon (e.g., at least about 95 wt %, at least 99 wt %, or at least 99.9 wt %), the carbon percentage measured exclusive of any functional groups that might be attached to the particles, as discussed further below. In some cases, the graphite particles may contain one or more impurities (e.g., metals, dopants) within or between their carbon lattices (e.g., as in the case of intercalated graphite). An example of an intercalated graphite particle can include, for example, potassium graphite ($KC_8$), calcium graphite ($CaC_8$), and the like. Intercalated graphite can be capable of exhibiting superconductivity (i.e., essentially zero electrical resistance).

While the embodiments described herein predominantly describe the use of graphite particles, it should be understood that the invention is not so limited. In some embodiments, the microfluid can comprise particles that comprise any suitable material with relatively high thermal conductivity. In some cases, the particles can comprise crystalline materials that exhibit basal cleavage. Basal cleavage is a phenomenon known to those of ordinary skill in the art, and refers to a behavior in which cleavage of a crystalline material occurs parallel to the base of a crystal. Examples of suitable materials include, but are not limited to, mica (e.g., biotite, muscovite, phlogopite, lepidolite, margarite, glauconite, etc.), clay minerals (e.g., kaolinite, illite, smectite, montmorillonite, vermiculite, talc, palygorskite, pyrophyllite, etc.), among others.

Figure 4:
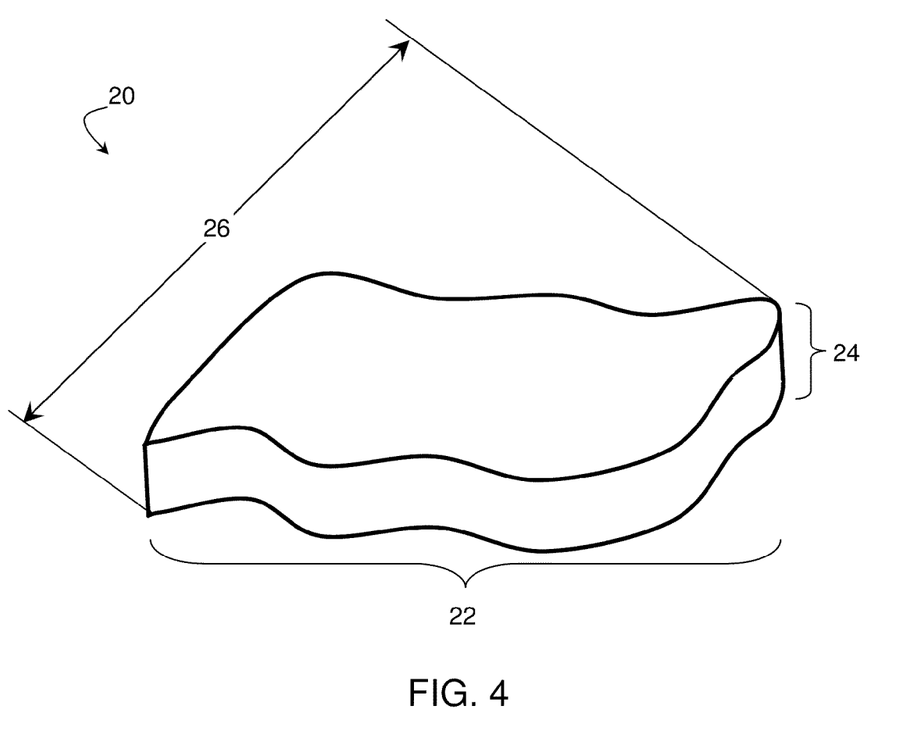
FIG. 4 includes a schematic illustration of a graphite particle, according to one set of embodiments.

In some embodiments, the graphite particles comprise microscale dimensions. The choice of particle dimension can be important in forming a stable suspension that exhibits enhanced thermal conductivity. For example, particles with microscale dimensions can be relatively easy to suspend in a fluid relative to particles with millimeter-scale or larger dimensions. In addition, fluids containing microscale particles are less likely to block a conduit in a heat exchanger system, compared to systems that employ particles with millimeter-scale or larger dimensions. In some embodiments, the average maximum cross-sectional dimension of a plurality of microscale graphite particles may be between about 500 nanometers and about 10 microns, between about 1 micron and about 5 microns, or between about 1 micron and about 10 microns. As used herein, the "maximum cross-sectional dimension" refers to the largest distance between two boundaries of an individual structure that may be measured. For example, in FIG. 4, graphite particle 20 has a width 22 and a thickness 24. The maximum cross sectional dimension of the graphite particle is indicated by dimension 26. The "average maximum cross-sectional dimension" of a plurality of particles refers to the number average of the maximum cross-sectional dimensions of those particles. One of ordinary skill in the art will be capable of determining the maximum cross-sectional dimension of a particle by analyzing scanning electron micrograph (SEM) images of the particle.

In some embodiments, a relatively high percentage of the graphite particles in a microfluid can have microscale dimensions. For example, in some embodiments, at least about 80%, at least about 90%, at least about 95%, or at least about 99% of the graphite particles within the graphite microfluid have maximum cross-sectional dimensions of between about 500 nanometer and about 10 microns, between about 1 micron and about 10 microns, or between about 1 micron and about 5 microns.

In some embodiments, the graphite particles used herein comprise graphite flakes. Generally, graphite flakes are characterized as having a thickness (e.g., measured substantially perpendicular to the graphene sheets within the flake) substantially smaller than the lateral dimensions of the flake (e.g., substantially parallel to the graphene sheets within the flake). In some embodiments, the aspect ratio of the graphite flake (i.e., the ratio of the maximum lateral dimension to the maximum thickness of the flake) is at least about 10:1, at least about 50:1, at least about 100:1, at least about 500:1, or at least about 1000:1.

In some embodiments, the microfluid can contain graphene-based particles formed of shapes besides flakes. The graphene-based particles may comprise, for example, microtubes or microcones. It should be understood that other shapes may also be possible. Not wishing to be bound by any theory, microtubes and microcones may form as graphene sheets roll up due to internal stress.

In some cases, the graphite particles described herein can be functionalized such that they include functional groups. One of ordinary skill in the art would understand the meaning of the phrase functional groups, and that functionalizing a surface would not include oxidizing a surface (e.g., oxidizing a portion of a surface or an entire surface, for example, via incidental exposure to oxygen in the atmosphere). In some embodiments, relatively hydrophobic graphite particles can be functionalized such that their surfaces become relatively hydrophilic, allowing for stable suspension within a hydrophilic fluid such as water and alcohols. For example, the graphite particles may comprise hydroxyl groups which can be formed, for example, upon oxidation of the graphite particles. The surface of the graphite particles can be functionalized to include a wide variety of functional groups such as, for example, hydroxyl groups, carbonyl groups, epoxy groups, and the like. Functionalization of the surface of graphite particles may be useful in tailoring the hydrophilicity of the graphite particles, as described in more detail below. In some embodiments (e.g., when the microfluid contains a hydrophilic fluid such as an alcohol or water), functionalization of the graphite particles may enhance the stability of the suspension of the graphite particles, or it may allow for the stable suspension of particles that would otherwise form unstable suspensions.

The microfluids described herein may comprise any suitable concentration of graphite particles. In some embodiments, the microfluid may comprise below about 2 vol %, below about 1 vol %, between about 0.01 vol % and about 2 vol %, between about 0.05 vol % and about 2 vol %, between about 0.1 vol % and about 2 vol %, between about 0.5 vol % and about 2 vol %, between about 1 vol % and about 2 vol %, between about 0.01 vol % and about 1 vol %, between about 0.05 vol % and about 1 vol %, between about 0.1 vol % and about 1 vol %, between about 0.5 vol % and about 1 vol %, between about 0.8 vol % and about 1 vol %, or between 0.9 vol % and about 1 vol %. In some embodiments, it is also possible to produce microfluids including particle concentrations outside the ranges described above. One of ordinary skill in the art is capable of calculating the volume percentage of particles (e.g., graphite particles) in a microfluid. For example, to make such a calculation, the mass of the particles can be measured. The volume of the particles can then be calculated by dividing the measured mass by the density of the particles. The volume percentage can then be calculated by dividing the volume of the particles by the sum of the volume of the particles and the volume of the medium in which the particles are suspended.

Any suitable fluid (e.g., liquid) may be used to produce the microfluids described herein. In some embodiments, the microfluid may comprise an alcohol (e.g., ethanol, ethylene glycol, etc.), water, or a combination of water and alcohol(s). In some instances, the microfluid may comprise an oil (e.g., poly-alpha-olefin ("PAO") oil, silicon oil, mineral oil, ester synthetic oil, ethylene oxide/propylene oxide synthetic oil, polyalkylene glycol synthetic oil, etc.). In some cases, it is also possible to use other fluids. The selection of the fluid type may depend on the application in which the microfluid is used.

The microfluid can contain, in some cases, a hydrophilic fluid (e.g., water, alcohols, etc.). In some embodiments, the microfluid can contain a hydrophobic fluid (e.g., oils, etc.). Generally, the terms hydrophilic and hydrophobic are given their normal meaning in the art, and are used to refer to a fluid's ability to form a stable mixture with water without the use of a surfactant or other entity that stabilizes the interaction between the fluid and the water.

In some cases (e.g., when the microfluid contains a hydrophobic fluid such as an oil), the graphite particles are capable of forming a stable suspension within the fluid in the absence of functional groups on the surfaces of the graphite particles (e.g., phenyl groups or carboxylic groups). In some cases, the graphite particles are capable of forming a stable suspension within the fluid in the absence of a surfactant. In some cases, the graphite particles are capable of forming a stable suspension within the fluid in the absence of all stabilizing agents. A "stabilizing agent," as used herein, refers to any entity that increases the stability of a suspension of the graphite particles relative to the stability that would be present in the absence of the stabilizing agent, but under essentially identical conditions (i.e., temperature, pressure, etc.). Exemplary stabilizing agents include, for example, surfactants, acids, alkaline materials, stabilizing functional groups attached to the graphite particles (e.g., phenyl groups or carboxylic groups), and the like.

For example, in some embodiments, the microfluid can contain a stable suspension of graphite particles and substantially no functional groups on the surfaces of the graphite particles (and/or surfactants, and/or any other stabilizing agent). In some cases, the microfluid may contain functional groups on the surfaces of the graphite particles (and/or surfactants, and/or another stabilizing agent), but the graphite particles are still capable of forming a stable suspension in the microfluid, even in the absence of the stabilizing agent. In some cases, the functional groups on the surfaces of the graphite particles (and/or surfactants in the microfluid, and/or any other stabilizing agent in the microfluid) may have no material affect on the stability of the suspension of the graphite particles. In other cases, the functional groups on the surfaces of the graphite particles (and/or surfactants in the microfluid, and/or any other stabilizing agent in the microfluid) may have a slight effect on the stability of the suspension, but the effect is not large enough to require the use of the functional groups on the surfaces of the graphite particles (and/or surfactants in the microfluid, and/or any other stabilizing agent in the microfluid) in forming a stable suspension. As a specific example, the microfluid may comprise graphite particles suspended in an oil (e.g., PAO oil). The graphite particles may form a stable suspension in the oil in the absence of phenyl and/or carboxylic functional groups attached to the graphite particles. A small number of phenyl and/or carboxylic functional groups may then be added to the graphite particles in the microfluid. In such a case, the graphite particles would still be said to be capable of forming a stable suspension in the absence of the functional groups because the microfluid comprised a stable suspension prior to the addition of the functional groups.

While some embodiments include microfluids substantially free of surfactant, in other embodiments, the microfluid may comprise one or more surfactants such as, for example, polyvinyl alcohol (PVA), poly-vinylpyrrolidone (PVP), sodium dodecyl sulfate (SDS), succinimide, CATB, methyl cellulose, sapogenin, etc.

The microfluids described herein can comprise one or more favorable properties. For example, the microfluids may exhibit enhanced thermal conductivity. Not wishing to be bound by any theory, the high thermal conductivity of the microfluids may be due to the high directional thermal conductivity of the graphite particles. Also, by using graphite particles with microscale lengths, rather than nanoscale lengths, the heat conduction pathway between two given points is interrupted (e.g., via relatively low-thermal conductivity fluid interspersed between particles) less often within a microfluid relative to a nanofluid.

In some cases, the thermal conductivity of the microfluid can be at least about 0.15, at least about 0.6, at least about 0.9, at least about 1.2, or at least about 1.5 W/mK. The relative thermal conductivity ratio of the microfluid can be, in some embodiments, at least about 1.1, at least about 1.25, at least about 1.5, at least about 1.75, at least about 2.0, at least about 2.5, or at least about 3.0. The relative thermal conductivity ratio is calculated as:

$$K_R = \frac{K}{K_0} \quad [1]$$

where K refers to the thermal conductivity of the microfluid containing the graphite particles and $K_0$ refers to the thermal conductivity of an essentially identical fluid that does not contain the graphite particles. For example, for a microfluid consisting of water and graphite particles, the relative thermal conductivity ratio of the microfluid would be calculated by dividing the thermal conductivity of the microfluid by the thermal conductivity of water.

In some embodiments, The thermal conductivity enhancement of the microfluid relative to the pure fluid without graphite particles can be, in some embodiments, at least about 25%, at least about 50%, at least about 75%, at least about 100%, at least about 150%, or at least about 200%. The thermal conductivity enhancement is calculated as:

$$K_{enhance} = \frac{K - K_0}{K_0} \times 100\% \quad [2]$$

where K and $K_0$ are used as described above.

The thermal conductivity of a fluid can be measured using the transient hot-wire method developed by Nagasaka and Nagashima in *J Phys E: Scientific Instruments*, Vol. 14, pp. 1435-1440 (1981), which is incorporated herein by reference in its entirety. To measure the thermal conductivity, a 50-micron diameter Pt wire with a 25 micron-thick insulating adhesion layer is fully immersed in the sample. The wire is subjected to a current pulse of precisely known amplitude, and the resulting temperature rise is determined as a function of time by monitoring changes in the electrical resistance of the wire. The thermal conductivity of the same is determined by analyzing the temporal temperature profile using solutions to the heat conduction equation.

The electrical conductivity of the microfluid can be enhanced, in some instances, relative to the electrical conductivity of a similar fluid without graphite particles. For example, the electrical conductivity of the microfluid can be at least about 100 times, at least about 500 times, at least about 1000 times, at least about 10,000 times, at least about 100,000 times, at least about 1,000,000 times, or at least about 10,000,000 times greater than the electrical conductivity of an essentially identical fluid that does not contain the graphite particles. In some embodiments, the electrical conductivity of the microfluid is at least about 0.001, at least about 0.01, at least about 0.1, at least about 1 s/m, or at least about 10 s/m. In some embodiments, the electrical conductivity of the microfluid is at least about 100 times, at least about 500 times, at least about 1000 times, at least about 10,000 times, at least about 100,000 times, at least about 1,000,000 times, or at least about 10,000,000 times greater relative to a substantially pure sample of the suspension fluid.

The microfluids described herein may comprise a stable suspension of particles, in some cases. For example, in some embodiments, the graphite particles can remain stably suspended within the fluid for at least about 1 day, at least about 1 week, at least about 1 month, at least about 6 months, or at least about 1 year. Generally, a stable suspension is one in which substantially no settling of the suspended phase (e.g., the graphite particles) occurs over the time period being measured.

In one aspect, a method of making a microfluid is described. The method may comprise adding a plurality of graphite particles to a fluid, and forming a stable suspension of graphite particles within the fluid. The graphite particles may comprise any one or more of the properties outlined above. In addition, the suspension may be formed with or without the use of a stabilizing agent, which can be added to the fluid before or after the graphite particles.

In some embodiments, the process of forming a microfluid can optionally comprise a graphite particle pre-processing step. The graphite particles can be a product of any suitable process. For example, the graphite particles can be produced by intercalating or expanding natural graphite, grinding, ball milling, chemical vapor deposition, etc. In one set of embodiments, the graphite can be exfoliated. In this process, the graphite is heated to relatively high temperatures (e.g., between about 600° C. and about 900° C.), for example, in a furnace or a microwave oven. The graphite can be heated for between about 5 seconds and about 180 seconds. In some cases, an acid (e.g., sulfuric acid) is added to the graphite particles during the exfoliation process. Upon heating, the graphite can expand. In some embodiments, the volume of the expanded graphite can be at least about 50 times, at least about 100 times, at least about 300 times, or at least about 500 times greater than the volume of the original graphite particles. Accordingly, the density of the expanded graphite particles may be at least about 50 times, at least about 100 times, at least about 300 times, or at least about 500 times less than the density of the original graphite particles. The reduction in density of the graphite particles can allow for improved suspension due to increased buoyancy, in some embodiments. The expanded graphite can be added to the fluid and sonicated (e.g., ultrasonicated). In some cases, the graphite particles may be dried and re-suspended in a fluid.

In some embodiments, residual functional groups may be present on the graphite particles due to the exfoliation process. For example, the graphite particles may comprise hydroxyl, epoxy or carboxyl groups after they have been exfoliated. Not wishing to be bound by any particular theory, residual functional groups may be present due to an interaction with chemicals (e.g., an acid such as sulfuric acid or another strong acid, oxidizing agents, etc.) or a base during the exfoliation process. In some instances, substantially nothing is added (e.g., no functional groups on the surfaces of the graphite particles, no surfactants, and/or no other stabilizing agents) to the graphite particles or the graphite microfluid after the exfoliation process. For example, in some cases, the graphite particles are exfoliated, and the exfoliated particles are added directly to the fluid from which the microfluid is formed, without adding functional groups to the particles and/or without adding an acid, a base, a surfactant, or any other stabilizing agent. In some embodiments, the graphite particles may be capable of forming a stable suspension without the addition of any materials (e.g., acid, bases, surfactants, functional groups, etc.) after the exfoliation of the graphite particles. For example, in some cases, an acid, a functional group, and/or other agent may be added to the graphite particles after exfoliation (which may include an acid treatment step), but the graphite particles would still have been capable of forming a stable suspension in the microfluid, even in the absence of the acid or other agent. In some cases, the addition of an acid, functional group, or other agent after the exfoliation step may have no material affect on the stability of the suspension of the graphite particles.

As described, the systems and methods described herein may be used to produce fluids with enhanced thermal and/or electrical conductivities, relative to those of similar fluids without graphite particles. Such fluids may find particular use, for example, in heat exchanger systems. Efficient heat transfer in such systems allows for effective cooling using a relatively small heat exchanger. In addition, the microfluids described herein may be useful as electrically conductive fluids.

The systems and methods described herein may provide one or more advantages relative to traditional conductive fluid systems. For example, conductive fluids that use nanoparticles or carbon nanotubes may produce agglomerated or tangled particles within the fluid, and can result in the phase separation of sediments. The microscale graphite particles described herein can be relatively easy to suspend due to, for example, the low density of graphite (about 2 to 2.2 g/cm$^3$) and relatively large surface area and/or a relatively higher surface charge density. In addition, graphite exhibits a relatively high in-plane thermal conductivity (about 1000 W/mK or larger). Also, relative to carbon nanotubes and many nanoparticles, microscale graphite particles are inexpensive to manufacture. Graphite is also a natural lubricant, which can help to reduce the surface damage to any working parts (or, for example, a coating on the working parts) with which the fluid may be in contact. Finally, the relatively long length of the microscale particles (compared to, for example, nanoscale particles) allows for enhanced heat transfer along a longer length before the transfer is interrupted by the presence of a relatively low-thermal conductivity fluid interspersed between the particles.

The following example is intended to illustrate certain embodiments of the present invention, but is not to be construed as limiting and does not exemplify the full scope of the invention.

EXAMPLE

In this example, the production and testing of graphite microfluids is described. Natural graphite was obtained from Asbury Carbons (Asbury Graphite Mills, Inc., NJ, USA). The natural graphite was used to produce graphite intercalation compounds using the chemical oxidation process proposed by Tryba et. al. (*Carbon* 43 (2005), pp. 2397-2429, which is incorporated herein by reference in its entirety for all purposes). Various volume fractions of Hydrogen peroxide (from 0 to 30 vol %) were mixed with $H_2SO_4$ to produce the oxidative agent for the intercalation process. 2.2 g of natural graphite were reacted with 100 ml of the oxidative agent at room temperature for 30 min. The slurry was then rinsed with distilled water to obtain a pH of about 6 to 7, and kept on a hotplate at about 80° C. for about 24 h. The graphite was then heated in a 1100 W Haier microwave oven for between 5 seconds and 180 seconds, and the volume of the graphite was expanded to over 300 times its original size. The expanded graphite was then added to a solvent and ultrasonicated for between 15 minutes and 120 minutes to produce suspended graphite particles.

To begin, the effect of graphite particle concentration on thermal conductivity was tested. Poly-alpha-olefin ("PAO"), ethylene glycol, and water were used as the fluid portions of the microfluids. Graphite particles were added in volume fractions of 0.1%, 0.3%, 0.5%, 0.6%, 0.7%, 0.8%, 0.9%, and 1.0% to each of the three fluids to form 24 graphite microfluid samples. The thermal conductivity of each graphite microfluid sample was measured using the transient hot-wire method developed by Nagasaka and Nagashima. In this example, a 50-micron diameter Pt wire with a 25 micron-thick insulating adhesion layer was fully immersed in the samples. The wire was subjected to a current pulse of precisely known amplitude and the resulting temperature rise was determined as a function of time by monitoring changes in the electrical resistance of the wire. By analyzing the temporal temperature profile using solutions to the heat conduction equation, the thermal conductivity of each sample was determined.

Figure 5A:
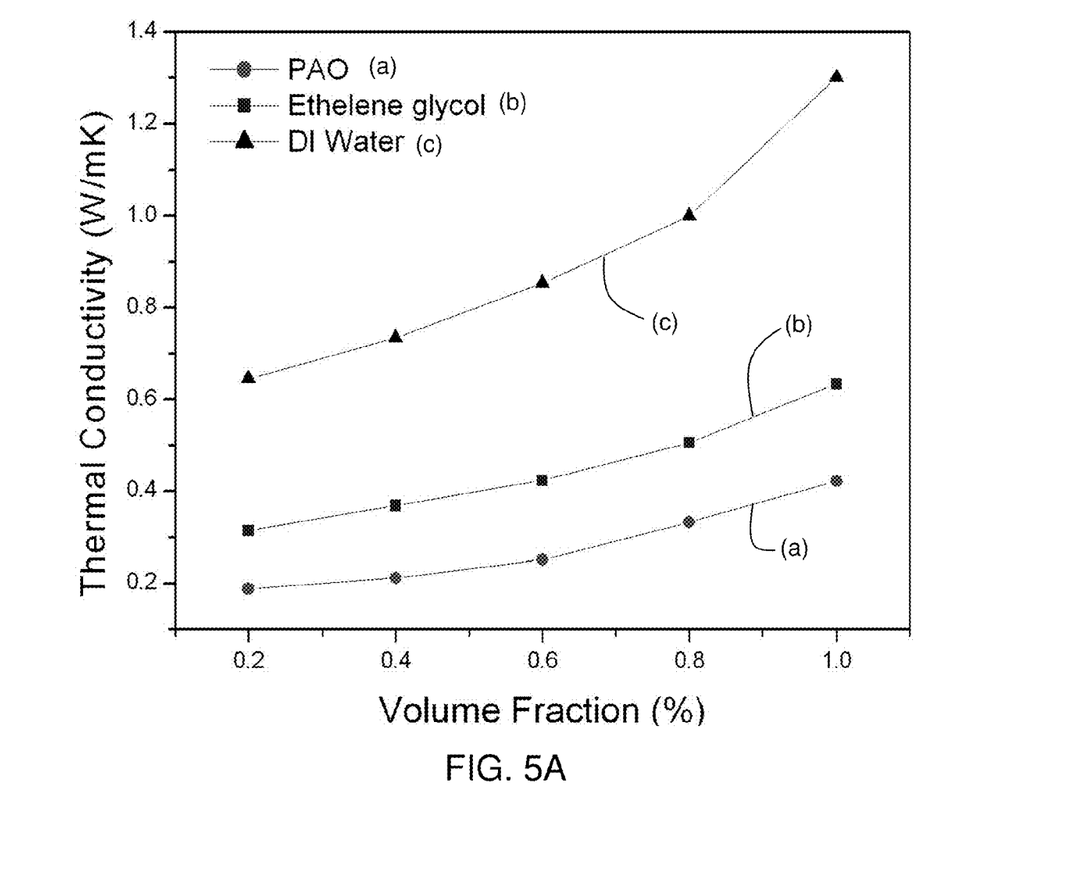
FIGS. 5A-5B include exemplary plots of thermal conductivity as a function of particle concentration.
Figure 5B:
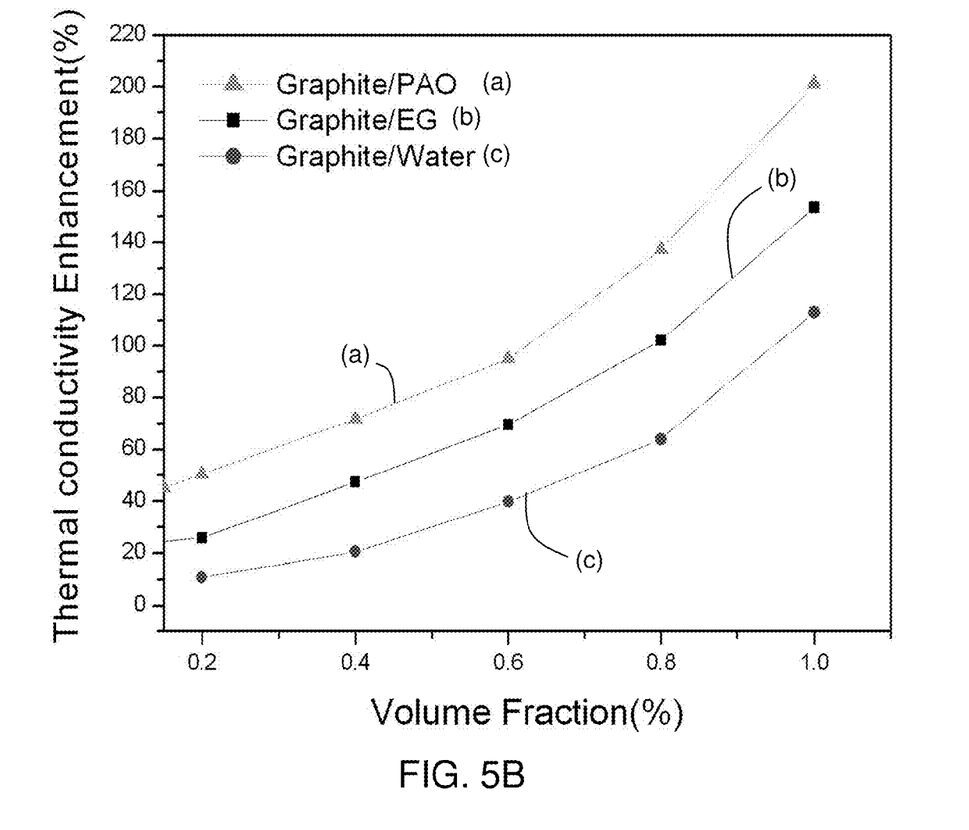

FIGS. 5A-5B include plots of the thermal conductivity and the thermal conductivity enhancement, respectively, as a function of the volume fraction of the graphite particles for the microfluid samples. All three fluids exhibited an increase in thermal conductivity of over 100% at graphite particle concentrations of 1 vol %. As shown in FIG. 5B, addition of 1 vol % graphite particles to water increased its thermal conductivity to over 1.27 W/mK, an especially large enhancement of over 110% (corresponding to a relative thermal conductivity of over 2.1 relative to DI water (0.6 W/mK) at 25° C.) to over 1 W/mK. In addition, FIGS. 5A-5B illustrate that the thermal conductivity varies non-linearly with graphite particle volume fraction, with progressively larger increases at larger graphite particle volume fractions.

Figure 6:
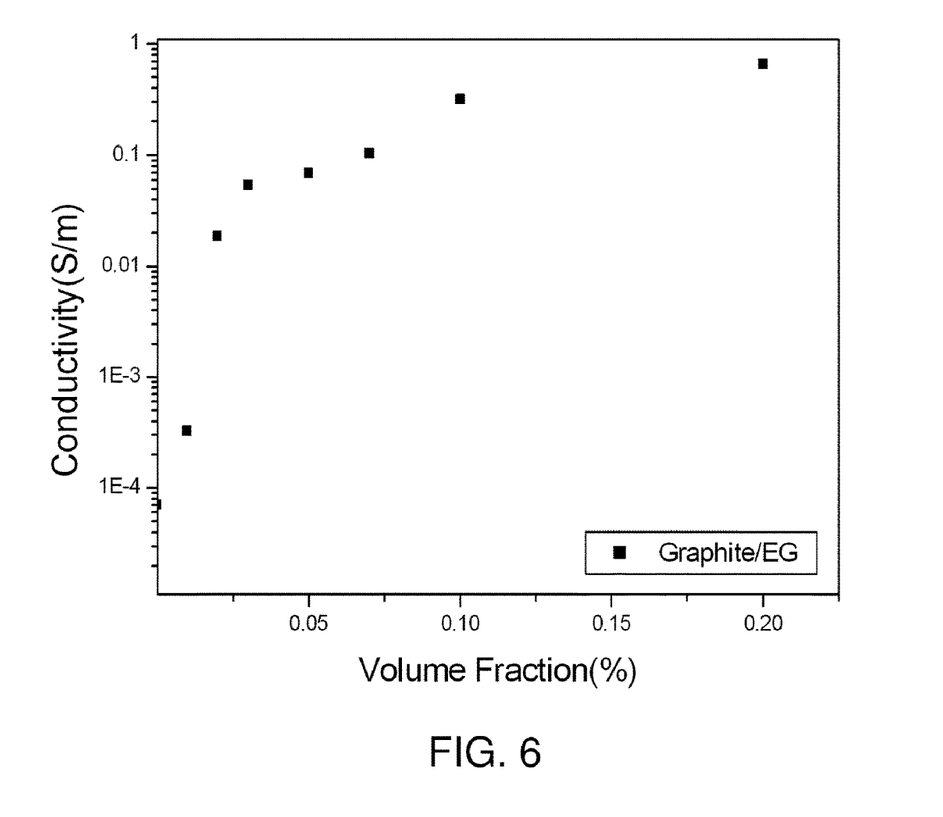
FIG. 6 includes a plot of electrical conductivity as a function of particle concentration, according to one set of embodiments.

Next, the electrical conductivities of ethylene-glycol-based microfluids were tested. Graphite particles were added to ethylene glycol in volume fractions of 0.01%, 0.02%, 0.03%, 0.05%, 0.07%, 0.85%, 0.1%, 0.2%, and 0.3%. In addition, the electrical conductivity of a substantially pure ethylene glycol sample was measured. FIG. 6 includes a plot of the electrical conductivities (on a log-scale axis) of each of the 9 tested samples. The electrical conductivity increased from about $7 \times 10^{-5}$ for a microfluid containing no graphite particles to over 0.6 s/m for a microfluid containing 0.2 vol % graphite particles, an increase of four orders of magnitude.

What is claimed is:

1. A microfluid, comprising:
    a hydrophobic fluid; and
    a plurality of amphiphilic graphite particles having an average maximum cross-sectional dimension of between about 500 nanometers and about 10 microns, wherein the graphite particles form a stable suspension within the fluid, and the graphite particles are in the substantial absence of a surfactant.

2. The microfluid of claim 1, wherein the fluid comprises an oil.

3. The microfluid of claim 1, wherein the graphite particles are in the substantial absence of a stabilizing agent.

4. The microfluid of claim 1, wherein the graphite particles comprise graphite flakes.

5. The microfluid of claim 1, wherein the graphite particles comprise exfoliated graphite.

6. The microfluid of claim 1, wherein the graphite particles have an average maximum cross-sectional dimension of between about 1 micron and about 10 microns.

7. The microfluid of claim 1, wherein the concentration of graphite particles within the fluid is between about 0.01 vol% and about 2 vol%.

8. The microfluid of claim 1, wherein the graphite particles remain stably suspended within the fluid for at least 1 day.

9. The microfluid of claim 1, wherein the thermal conductivity enhancement of the microfluid is at least about 10%.

10. The microfluid of claim 1, wherein the aspect ratio of the graphite particles is at least about 10:1.

11. A microfluid, comprising:
    a fluid comprising at least one of water and an alcohol; and
    a plurality of amphiphilic graphite particles having an average maximum cross-sectional dimension of between about 500 nanometers and about 10 microns suspended within the fluid, wherein the graphite particles form a stable suspension within the fluid, and the graphite particles are in the substantial absence of a surfactant.

12. The microfluid of claim 11, further comprising an alkaline material.

13. The microfluid of claim 12, wherein the alkaline material comprises a hydroxide salt.

14. The microfluid of claim 13, wherein the hydroxide salt functionalizes at least a portion of the graphite particles.

15. The microfluid of claim 11, wherein the fluid comprises water.

16. The microfluid of claim 11, wherein the fluid comprises an alcohol.

17. The microfluid of claim 16, wherein the alcohol comprises ethylene glycol.

18. A method, comprising:
    adding a plurality of amphiphilic graphite particles to a fluid, wherein the plurality of graphite particles has an average maximum cross-sectional dimension of between about 500 nanometers and about 10 microns, and the plurality of graphite particles are in the substantial absence of a surfactant; and
    forming a stable suspension of the graphite particles within the fluid.

19. The method of claim 18, further comprising exfoliating the plurality of graphite particles prior to adding the particles to the fluid.

20. A microfluid, comprising:
    a fluid; and
    a plurality of amphiphilic flakes, wherein:
        each of the plurality of flakes has an aspect ratio of at least about 10:1,
        the plurality of flakes have an average maximum cross-sectional dimension of between about 500 nanometers and about 10 microns,
        the plurality of flakes form a stable suspension within the fluid, and
        the plurality of flakes are in the substantial absence of a surfactant.

* * * * *

UNITED STATES PATENT AND TRADEMARK OFFICE
CERTIFICATE OF CORRECTION

| | | |
|---|---|---|
| PATENT NO. | : 8,192,643 B2 | Page 1 of 1 |
| APPLICATION NO. | : 12/638135 | |
| DATED | : June 5, 2012 | |
| INVENTOR(S) | : Ruiting Zheng | |

It is certified that error appears in the above-identified patent and that said Letters Patent is hereby corrected as shown below:

Column 1, lines 5-6 Delete:

"This invention was sponsored by NSF Grant No. CBET-0506830. The government has certain rights in the invention."

and replace with:

--This invention was made with government support under Grant No. NSF0506830 awarded by the National Science Foundation. The government has certain rights in this invention.--

Signed and Sealed this
Twenty-seventh Day of November, 2012

David J. Kappos
*Director of the United States Patent and Trademark Office*